Figure 1:
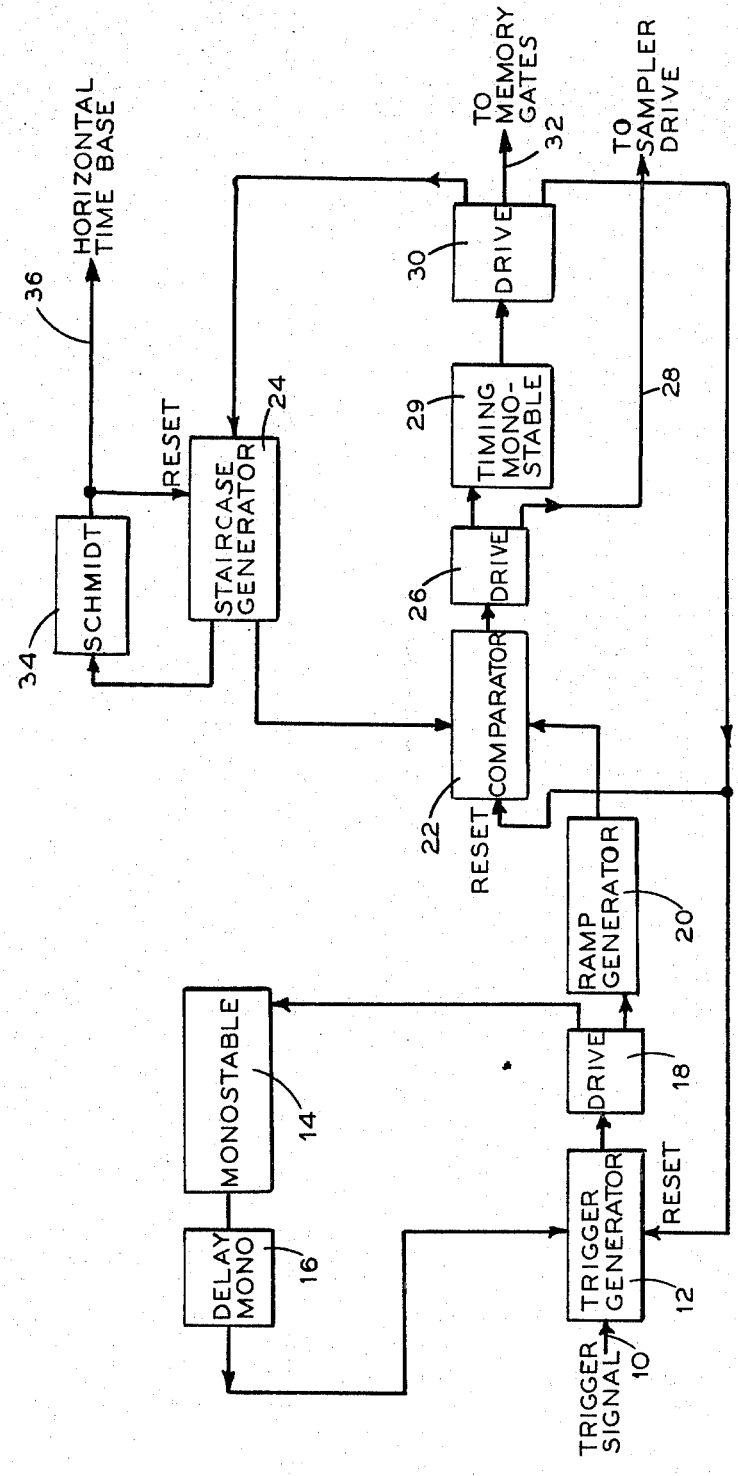

United States Patent
Martin et al.

[15] 3,699,458
[45] Oct. 17, 1972

[54] JITTER FREE TRIGGER CIRCUIT FOR A SAMPLING OSCILLOSCOPE

[72] Inventors: Edward Albert Martin, c/o Victoria Road, Farnborough, England; Douglas Garde, 280 Washington Street, Woburn, Mass. 01801

[22] Filed: March 10, 1971

[21] Appl. No.: 122,878

[30] Foreign Application Priority Data

March 12, 1970  Great Britain..........11,997/70

[52] U.S. Cl. .............328/60, 307/228, 307/262, 307/268, 307/286, 307/293, 307/322, 328/181
[51] Int. Cl. .............................H03k 1/00, H03k 3/04
[58] Field of Search......307/228, 260, 262, 268, 286, 307/293, 322; 328/59, 60, 61, 181, 184, 185

[56] References Cited

UNITED STATES PATENTS

| | | | |
|---|---|---|---|
| 3,530,315 | 9/1970 | Kaufman | 307/293 X |
| 3,350,576 | 10/1967 | Zimmerman | 307/273 X |
| 3,244,989 | 4/1966 | Carlson | 328/185 |
| 3,303,359 | 2/1967 | Des Brisay, Jr. | 328/184 X |
| 3,484,624 | 12/1969 | Rasiel et al. | 328/185 X |
| 3,317,743 | 5/1967 | Rogers | 328/185 X |
| 3,358,159 | 12/1967 | Smith | 307/228 |
| 3,408,580 | 10/1968 | Moriyasu | 307/228 X |
| 3,558,930 | 1/1971 | Knapton et al. | 307/228 X |

Primary Examiner—Stanley D. Miller, Jr.
Attorney—William R. Sherman, Stewart F. Moore, Jerry M. Presson, Leonard R. Fellen and Roylance, Abrams, Berdo & Kaul

[57] ABSTRACT

In a trigger pulse generator for an oscillator jitter is liable to occur in the trigger pulses because of uncertainties in the timing of the end of the hold-off signal relative to the instants at which a trigger signal reaches a trigger level. Jitter is eliminated by arming an output circuit when the hold-off signal ends and the trigger signal reaches the trigger level. The output circuit generates a trigger pulse, when it is armed, in response to the trigger signal delayed by a predetermined amount.

1 Claim, 5 Drawing Figures

JITTER FREE TRIGGER CIRCUIT FOR A SAMPLING OSCILLOSCOPE

This invention relates to a trigger pulse generator for deriving trigger pulses from selected cycles only of a periodic signal which will be called the trigger signal. The generator can also be used, like known trigger pulse generators, with an aperiodic or one-shot trigger signal but this is a difference only in the use of the circuit and it will be convenient to describe the invention in relation to periodic trigger signals only. The generator is particularly useful in an oscilloscope in which the trigger pulses trigger the time base of a sampling circuit and, although the circuit can be used in an ordinary oscilloscope in which the trigger signal is displayed in real time, it has special applicability in a sampling oscilloscope. In a sampling oscilloscope the displayed waveform is built up from a succession of samples which are taken at instants progressively delayed with respect to the trigger pulses and the trigger pulses are derived from every N'th cycle of the trigger signal where N is a large number of the order of 1,000 for example. If N has this value and the increment of delay is such that 100 samples are required to build up a complete cycle of the trigger signal, the effective frequency of the displayed waveform is $10^{-5}$ times that of the trigger signal. Thus the trigger signal is displayed with its time scale expanded by a factor of $10^5$ but with preservation of the waveform.

Such oscilloscopes are well known in themselves but serious difficulties are encountered in deriving the trigger pulses. To effect the division by a factor of N, a pre-determined delay substantially equal to N/F, where F is the frequency of the trigger signal, is established by a circuit usually referred to as the hold-off circuit (typically a monostable circuit), and a trigger pulse is generated when the trigger signal next passes through a trigger level after the falling edge of the signal provided by the hold-off circuit, this signal being referred to herein as the hold-off signal. However, it is virtually impossible to keep the duration of the hold-off signal determinate to within a fraction of a cycle of the trigger signal and there is necessarily uncertainty regarding the timing of the falling edge of the hold-off signal relative to the instant at which the trigger signal passes through the trigger level. This leads to jitter in the trigger pulses, which completely upsets the display. The basic operation summarized in this paragraph can be described by saying that the hold-off circuit arms the trigger circuit, which is a two state circuit.

It has already been proposed to overcome the problem of jitter by using the hold-off circuit to arm a first trigger circuit which, when it triggers, arms a second trigger circuit. The two circuits have different trigger levels, whereby there is a delay between the two circuits firing. Although there will be jitter in the timing of the first circuit, if the delay is suitable, the jitter will be substantially eliminated when the second circuit fires. However the length of the delay is a function of the difference between the trigger levels and of the frequency and waveform of the trigger signal. The latter factors are obviously variable and it is necessary to provide controls for adjusting both trigger levels to get reliable operation for any given trigger signal. The adjustment of these controls is tedious and readjustments have to be effected frequently, making the oscilloscope troublesome to use.

The object of this invention is to provide an improved trigger pulse generator which, while of general applicability when jitter-free trigger pulses have to be derived from selected cycles of a trigger signal, is particularly directed towards solving the problem of triggering a sampling oscilloscope satisfactorily.

According to the present invention there is provided a trigger pulse generator comprising a hold-off circuit arranged to arm a two state circuit a pre-determined interval of time after each trigger pulse generated by an output circuit which is armed by the first two state circuit, and means for applying the trigger signal to the two state circuit and output circuit with a pre-determined delay in the signal applied to the output circuit compared with the signal applied to the two state circuit, the arrangement being such that the two state circuit switches its state in response to the trigger signal when armed and the output circuit generates a trigger pulse in response to the delayed trigger signal when armed.

As in the prior art, there may be jitter in the switching of the two state circuit, but this is substantially eliminated in the operation of the output circuit. In contrast to the prior art however the pre-determined delay is built into the circuitry of the generator and does not vary with the frequency or waveform of the trigger signal.

The two state circuit can be a trigger circuit, the output circuit can comprise a second trigger circuit and, in a development of the invention, a third trigger circuit is added. This is fired by the hold-off circuit and arms the first trigger circuit (the first trigger circuit being thus indirectly armed by the hold-off circuit). There will be substantial jitter in the firing of the third circuit but it effectively sharpens up the falling-edge of the hold-off signal and thus reduces the jitter in the firing of the first circuit. All the trigger circuits are preferably tunnel diode circuits of a type known in themselves.

The trigger levels of the first and second trigger circuits are preferably the same, a single control being provided for varying the single trigger level. However, uncertainty in operation can arise when the said pre-determined delay is equal to the period of the trigger signal, or an integral multiple thereof. To overcome this problem, a further control can be added for introducing an offset in the two trigger levels. The adjustment of this control is not critical (in contrast to the abovementioned prior art) and indeed it may be a switched control with two positions only; if the circuit is not operating well with the control in one position, it is changed to the other position to vary the two trigger levels relative to each other. In an alternative solution, the further control varies the pre-determined delay, e.g. between two switched values differing by say 30 percent.

In an alternative circuit a squared trigger signal is used and the first mentioned two state circuit is a bistable circuit armed via a gate, e.g. an AND gate, and the output circuit comprises another such gate.

Figure 2:
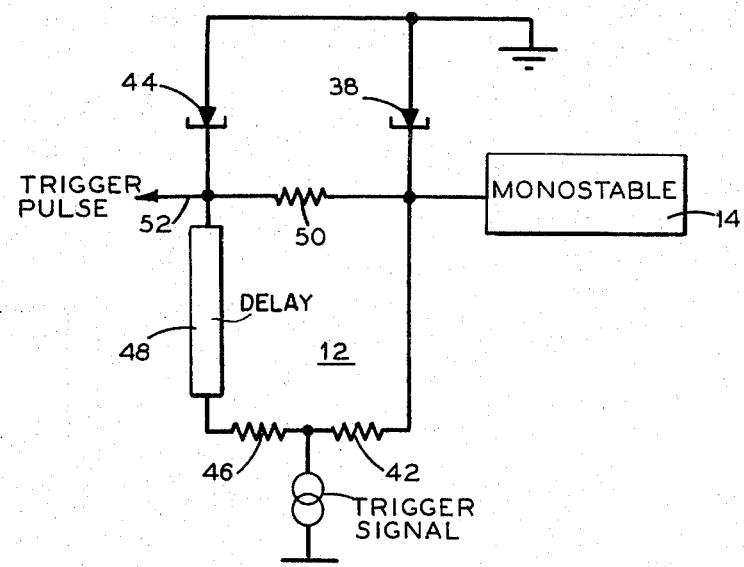
Figure 3:
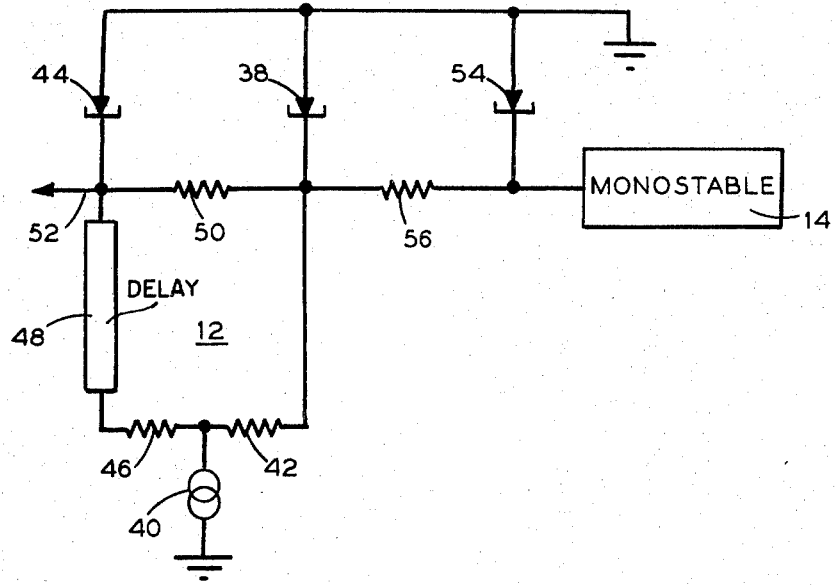
Figure 4:
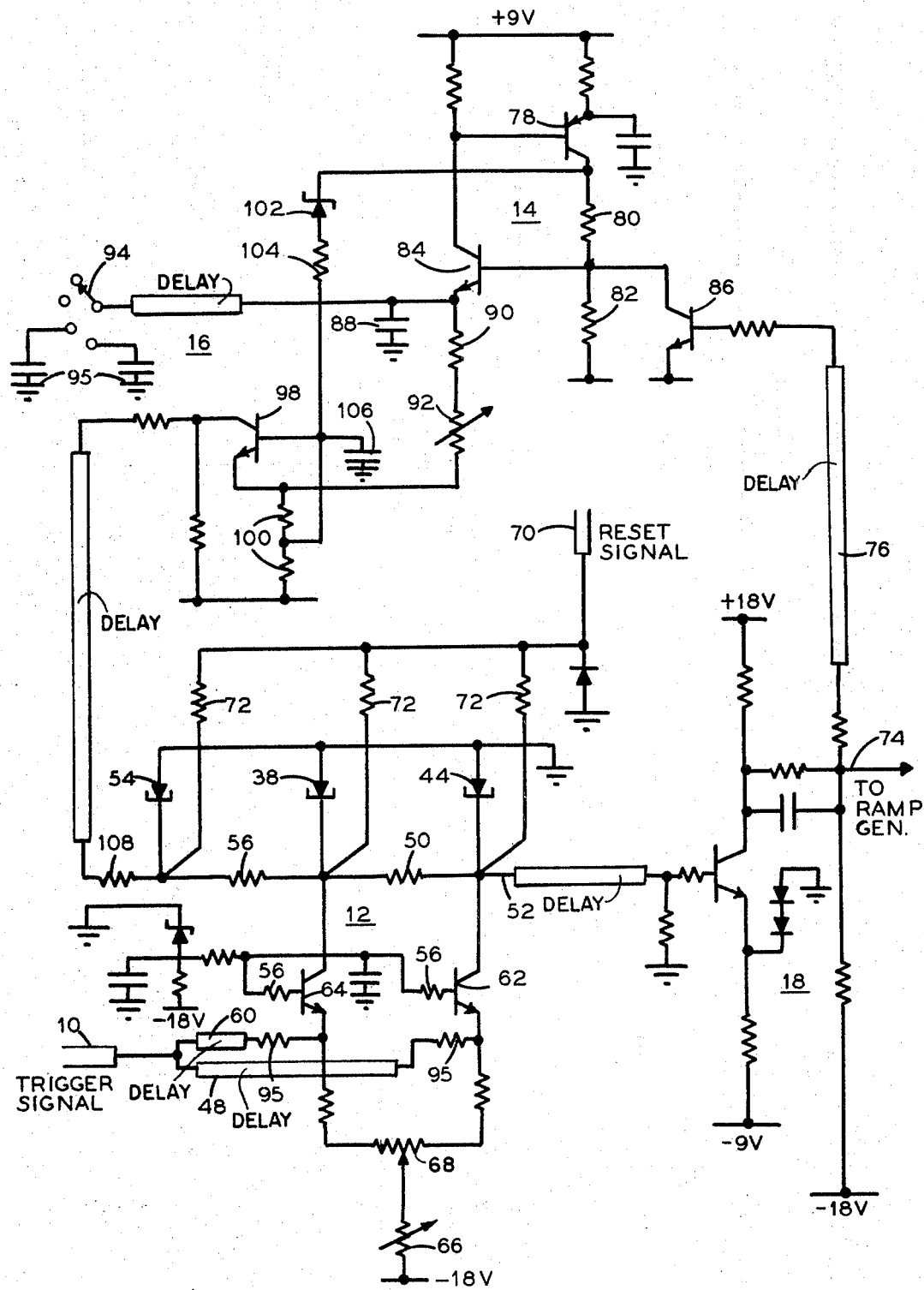
Figure 5:
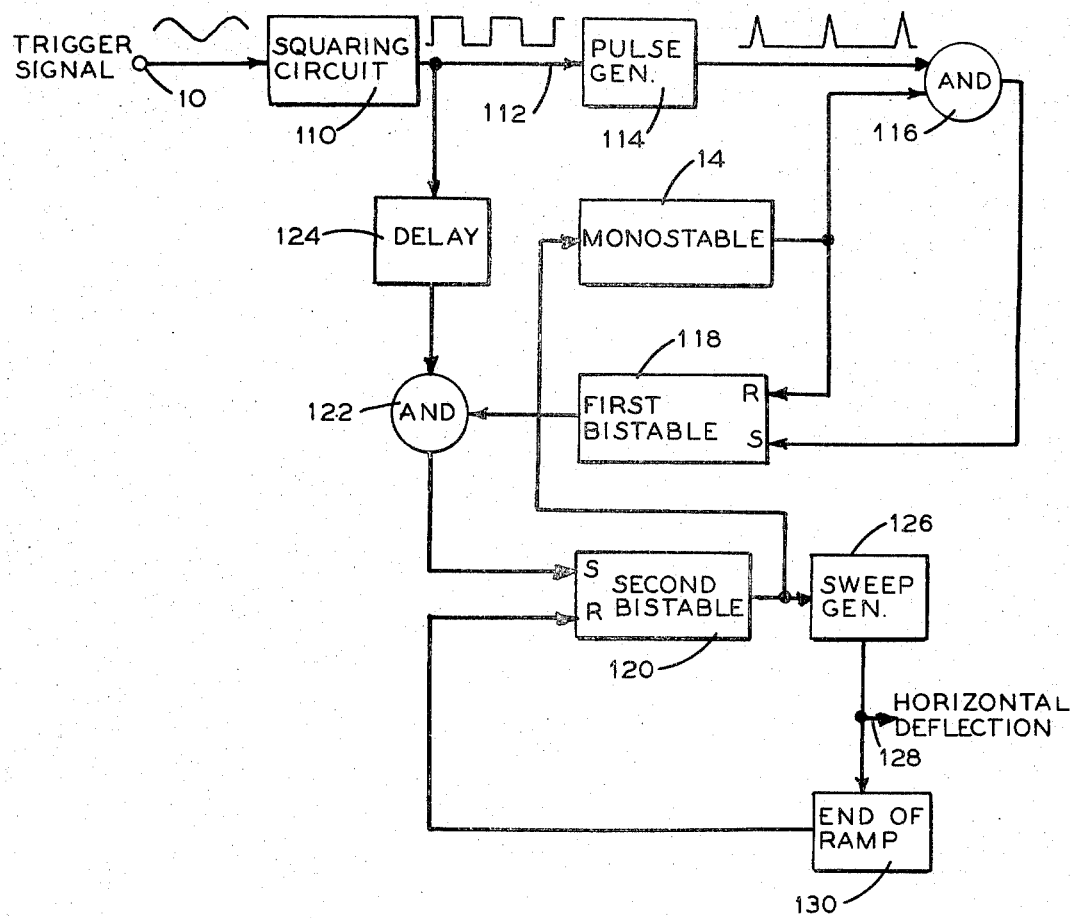

Embodiments of the invention will now be described by way of example, with reference to the accompanying drawings, in which:

FIG. 1 is a block diagram of the sampling time base circuits of a sampling oscilloscope, FIG. 2 shows the essentials of one trigger pulse generator embodying the invention, FIG. 3 shows the essentials in an improved version of FIG. 2, FIG. 4 is a detailed circuit diagram of the embodiment of FIG. 3, and FIG. 5 is a block diagram of another embodiment.

Referring to FIG. 1, the trigger signal is applied at input 10 to a trigger circuit 12. This is normally prevented from triggering by a hold-off circuit consisting of a main monostable 14 followed by a delay monostable 16. When the hold-off signal terminates, the trigger circuit 12 provides a trigger pulse to a buffer drive circuit 18 which sets the monostable 14 again to initiate the next hold-off period, determined by the delay of the two monostables.

The drive circuit 18 also starts a fast linear ramp generator 20 whose output is applied to a comparator 22. The other input to the comparator is provided by a staircase generator 24 which provides a stepped waveform, which steps up after each trigger pulse as described below. When the fast ramp reaches the level of the stepped waveform, a drive circuit 26 provides a pulse on an output 28 which is used, in known manner, to sample the trigger signal (and a second input signal in the case of a dual-beam scope). After a short delay determined by a timing monostable 29, a further drive circuit 30 applies a pulse on an output 32 which is used to operate conventional memory gates in the circuit which stores the samples taken from two input signals and provides the two vertical drive signals to the dual beam sampling scope.

The drive circuit 30 also pulses the staircase generator 24, which can integrate the pulses from the circuit 30 to build up the staircase waveform. When the output of the generator 24 reaches a pre-determined level, a Schmidt trigger circuit 34, or any suitable equivalent circuit, resets the generator 24 to its starting level to commence a fresh staircase waveform and also provides a pulse on line 36 to trigger the horizontal time base of the scope.

Finally the drive circuit 30 resets the trigger generator, as described in relation to FIG. 4 and also resets the comparator, assuming this to be of the type comprising a tunnel diode which triggers when the fast ramp reaches the staircase waveform level.

Each sample is delayed relative to the trigger pulse by the time taken for the fast ramp to reach the staircase waveform level. Since this level is progressively increased from trigger pulse to trigger pulse, the successive samples represent successively later points in the waveform of the trigger signal and thus the time-expanded replica of this waveform is built up and displayed on the scope.

FIG. 2 shows the essentials of one version of the trigger generator 12. The hold-off circuit is here shown as a single monostable 14 (the purpose of the second monostable 16 of FIG. 1 is explained below). The hold-off signal is applied to the cathode of a tunnel diode 38 constituting a first trigger circuit. The anode is connected to ground and the cathode is additionally connected to the trigger signal source, shown as a current source 40, through a resistor 42. The hold-off signal keeps the cathode at a level such that the trigger signal cannot fire the tunnel diode 38 but the falling edge of the hold-off signal acts as an arming signal which allows the trigger signal to fire the diode when it reaches a predetermined level, namely the trigger level. Because of the uncertainty in the timing of the arming signal and the fact that it is impracticable to make it a really sharp signal in this circuit, there is necessarily jitter in the firing of the first trigger circuit. This is substantially eliminated however by a second trigger circuit comprising another tunnel diode 44.

The diode 44 also has its anode grounded and its cathode is connected to the trigger signal source 40 through a resistor 46 and a delay line 48. The cathode is additionally connected to the cathode of the diode 38 through a resistor 50. Ordinarily the delayed trigger signal cannot fire the diode 44 but it can do so when the diode 38 fires and current flows through the resistor 50. When the diode 44 does fire a trigger pulse is available on its cathode for application over a line 52 to the drive circuit 18 (FIG. 1). The diode 44 is thus armed by the firing of the diode 38 and, because the trigger signal applied to the cathode of the thus-armed diode 44 is delayed by the delay line 48 triggering takes place in a substantially jitter-free manner. Looked at in another way, because the trigger signal on the cathode of the diode 38 is early relative to that on the cathode of the diode 44, the diode 38 can warn the diode 44 correctly when it is time for it to be triggered.

In the further improvement of FIG. 3 the monostable 14 does not directly arm the diode 38. Rather it fires a third tunnel diode 54, whereby current flows through a resistor 56 to arm the diode 38. Because of the rapid switching characteristic of tunnel diodes, the diode 38 is thus armed much more precisely and there is less jitter in the firing of the diode 38.

FIG. 4 is a detailed circuit diagram of blocks 12, 14, 16 and 18 of FIG. 1 embodying the trigger circuit 12 as shown in FIG. 3. The trigger signal input 10 is connected to two delay lines, namely the line 48 and a shorter line 60 which are connected to the cathodes of the tunnel diodes 44 and 38 respectively through common base U.H.F. transistors 62 and 64 which have a stabilized base bias. Two delay lines are used to match the two signal paths but the delay of the line 48 is greater than that of the line 60 by about 1 nS or less, depending on the speed on the tunnel diodes.

The trigger levels are adjusted by adjusting the bias currents through the emitters of the transistors 62 and 64 by means of a common variable resistor 66 with a control knob on the front panel of the scope. A potentiometer 68 provides for a differential control, e.g. for the purpose already mentioned in the introduction. Alternatively separate adjustable emitter resistors can be provided for the two transistors, preferably with concentric control knobs.

The three tunnel diodes trigger as previously described and then need to be reset to their non-conducting state. To this end the reset signal from the drive circuit 30 (FIG. 1) is applied as a positive pulse via input 70 in FIG. 4 and resistors 72 to the cathodes of the diodes.

The drive circuit 18 will not be described in detail. It provides an output on line 74 to the ramp generator 20 (FIG. 1) and also to the monostable 14 on line 76.

The main hold-off delay is provided by the monostable 14 but this is followed by the monostable 16 with a short delay. There are two reasons for using two monostables. One is that it is desirable, in order to define the hold-off time accurately, to trigger the monostable 14 off the trigger pulse, not off the reset pulse. This means that, using a single monostable, it would be required to trigger back to its astable state before it had time to settle in its stable state which would lead to jitter in the hold-off time. Using two monostables in cascade eliminates this problem. Secondly the main monostable 14 could disturb the trigger circuits by transients when it resets. The short delay provided by the monostable 16 allows the transients time to die away.

In the stable state of the main monostable 14 a transistor 78 is conductive and the voltage at the junction of resistors 80 and 82 renders a transistor 84 conductive, which in turn feeds base current to the transistor 78 to maintain this stable state. The trigger signal on line 76 saturates a transistor 86 which brings the base voltage of transistor 84 down to earth, turning this transistor off. The transistor 78 thus comes out of saturation and the base voltage of the transistor 84 will now be zero independently of whether the transistor 86 is conducting or not. This transistor therefore has a one-way effect; it can only trigger the monostable.

The reason why the transistor 84 cuts off is that a capacitor 88 is connected to its emitter. This capacitor now charges through a resistor 90 and variable resistor 92 which is used to adjust the hold-off time. When the capacitor has charged sufficiently the transistor 84 begins to conduct and hence begins to turn on the transistor 76. Degenerative action occurs and the monostable resets rapidly. Coarse control of the hold-off time can be effected by switching different capacitors 96 in parallel with the capacitor 88 by means of a switch 94.

The second monostable 16 comprises a transistor 98 which is normally biased off by a potential divider 100. When the transistor 78 turns on, a zener diode 102 conducts and the transistor 98 turns on with a delay determined by the zener diode, resistors 100 and 104 and a capacitor 106. Sufficient current now flows through a resistor 108 to trigger the tunnel diode 54 and start the trigger sequence already described. The resistors 100 rapidly reset the monostable 16 to ensure that there is insufficient current flowing through the transistor 98 to re-trigger the diode 54 when it is reset by the pulse on line 70.

In the embodiment shown in FIG. 5, which is for use with an ordinary, non-sampling oscilloscope, the trigger signal on terminal 10 is applied firstly to a squaring circuit 110 which produced a squared trigger signal on a line 112. The positive going edges of the squared signal are used to generate sharp pulses in a conventional circuit 114 whose output supplies one input to an AND gate 116. The output of the hold-off monostable 14 provides the other input to the gate 116 and it is arranged that the gate is enabled when the hold-off signal terminates. A first bistable circuit 118 has a set terminal S connected to the output of the gate 116. Accordingly the two-state circuit 118 is armed at the end of the hold-off signal and switches to the set state on receipt of the next pulse from the circuit 114. A second bistable circuit 120 is then armed by the output of the bistable circuit 118 enabling an AND gate 122 to which the squared trigger signal on line 112 is applied via a delay circuit 124 having a delay of say 5 to 10 ns. The first rising edge of the squared trigger signal sets the second bistable circuit 120 and there is substantially no jitter in the instant of switching even though there will be jitter in the instant at which the first bistable circuit 118 switches.

When the second bistable circuit is set, its output triggers a conventional sweep generator 126 and also fires the monostable 14. At the commencement of the hold-off signal then generated the gate 116 becomes dis-enabled and the first bistable circuit 118 is reset via its reset terminal R.

The output of the sweep generator 126 on a line 128 drives the horizontal deflection circuits of the oscilloscope and is also applied to an end of ramp detector circuit 130, in known manner, to reset the second bistable circuit 120 at the end of the horizontal sweep. The sweep generator 126 effects retrace and waits to commence the next sweep when the circuit 120 is next set.

In a copending application claiming priority from British Pat. application No. 11998/70, we have described an invention involving the generation of a pair of pre-trigger pulses from each cycle of the trigger signal. At the end of the hold-off signal the first pre-trigger pulse of the pair next occurring arms a trigger circuit and the following second pre-trigger pulse generates the actual trigger pulse. In contrast to this, the present invention involves the use of a delayed trigger signal and is usable at higher frequencies where it is completely impracticable to generate pre-trigger pulses off every cycle of the trigger signal.

What is claimed is:
1. A trigger pulse generator comprising:
a hold-off circuit for providing a hold-off signal of predetermined duration in response to each trigger pulse generated; a two state circuit responsive to the hold-off circuit to become armed at the end of the hold-off signal; means for squaring the trigger signal; means for applying the squared trigger signal to the two state circuit to cause the two state circuit rapidly to switch to a set state when this circuit has become armed; means for delaying the squared trigger signal; and an output gate circuit having first and second inputs, and an output at which an output signal is produced only when both the inputs are simultaneously energized, irrespective of which input became energized first; the first input being connected to be energized by said set state of the two-state circuit, the second input being connected to be energized by the delayed squared trigger signal, and said trigger pulse being derived from said output signal from the output gate circuit.

* * * * *

UNITED STATES PATENT OFFICE
CERTIFICATE OF CORRECTION

Patent No. 3,699,458  Dated October 17, 1972

Inventor(s) Edward Albert Martin and Douglas Garde

It is certified that error appears in the above-identified patent and that said Letters Patent are hereby corrected as shown below:

IN THE HEADING:

Insert:

--[73] Assignee: The Solartron Electronic Group Limited, Farnborough, Hampshire, England --.

Signed and sealed this 15th day of July 1975.

(SEAL)
Attest:

RUTH C. MASON
Attesting Officer

C. MARSHALL DANN
Commissioner of Patents
and Trademarks